No. 634,979. Patented Oct. 17, 1899.
H. W. HEADLAND.
ELECTRIC MOTOR FOR DRIVING MOTOR CARRIAGES, WINCHES, OR STATIONARY MACHINERY.
(Application filed Jan. 18, 1898.)
(No Model.) 3 Sheets—Sheet 1.
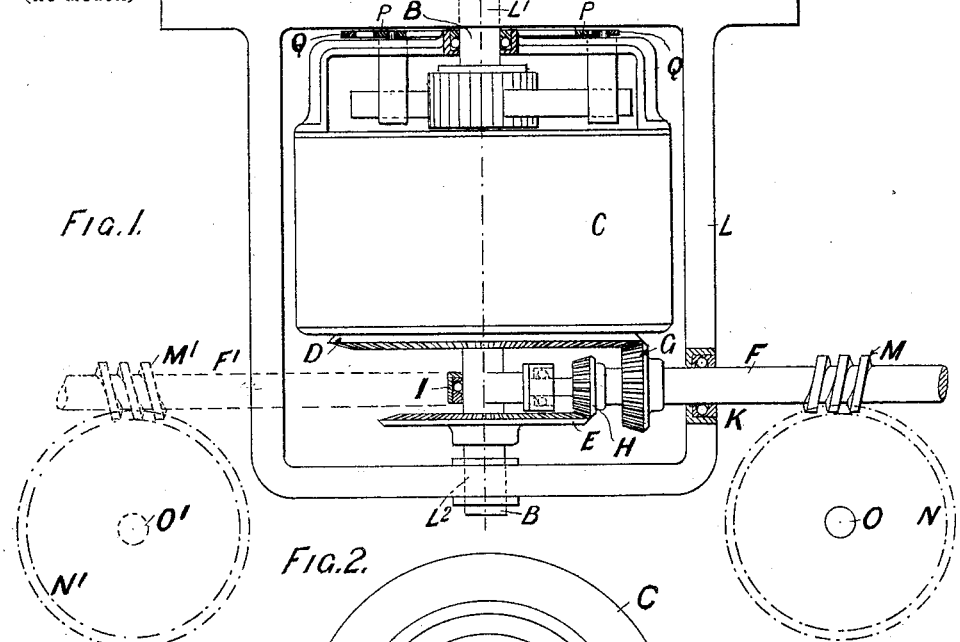
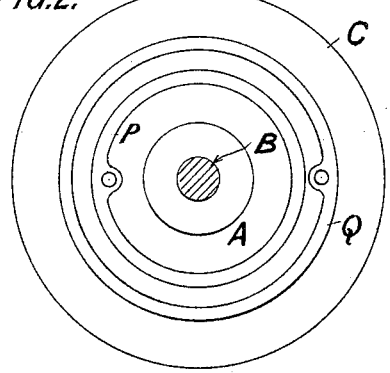
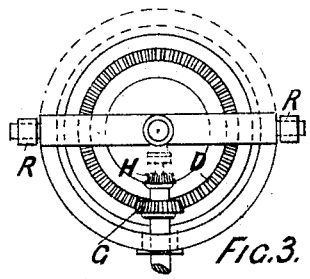
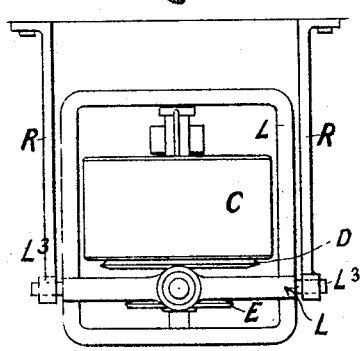

No. 634,979. Patented Oct. 17, 1899.
H. W. HEADLAND.
ELECTRIC MOTOR FOR DRIVING MOTOR CARRIAGES, WINCHES, OR STATIONARY MACHINERY.
(Application filed Jan. 18, 1898.)
(No Model.) 3 Sheets—Sheet 2.

No. 634,979. Patented Oct. 17, 1899.
H. W. HEADLAND.
ELECTRIC MOTOR FOR DRIVING MOTOR CARRIAGES, WINCHES, OR STATIONARY MACHINERY.
(Application filed Jan. 18, 1898.)
(No Model.) 3 Sheets—Sheet 3.
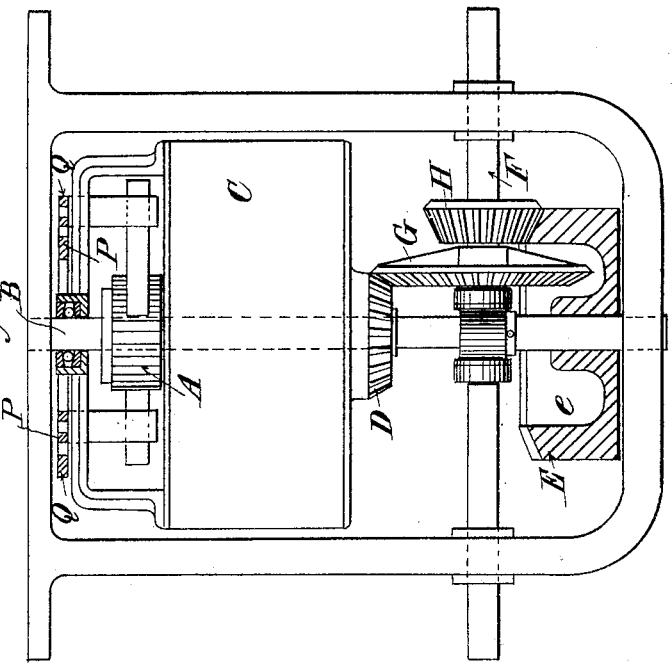
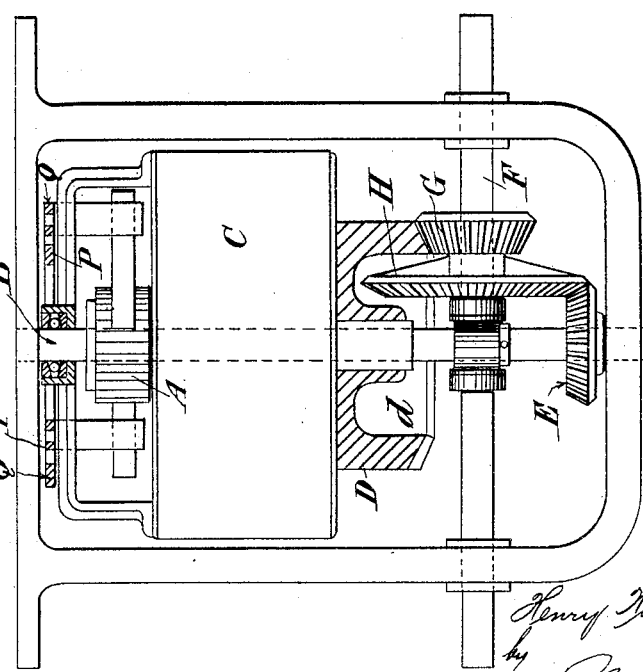

UNITED STATES PATENT OFFICE.

HENRY WILLIAM HEADLAND, OF LONDON, ENGLAND.

ELECTRIC MOTOR FOR DRIVING MOTOR-CARRIAGES, WINCHES, OR STATIONARY MACHINERY.

SPECIFICATION forming part of Letters Patent No. 634,979, dated October 17, 1899.

Application filed January 18, 1898. Serial No. 667,061. (No model.)

*To all whom it may concern:*

Be it known that I, HENRY WILLIAM HEADLAND, a subject of the Queen of Great Britain and Ireland, residing at Leyton, London, in the county of Essex, England, have invented certain new and useful improvements in electric motors for driving motor-carriages, winches, or stationary machinery, also as a portable motor for rotary hair and cleaning brushes and dentists' tools and for drilling, milling, and other purposes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This electric motor belongs to the class having the armature fixed on the shaft and the field-magnets applied to a casing or frame rotating freely on the shaft in the opposite direction and having bevel-tooth wheel-gearing arranged between the said shaft and casing. The construction of the bevel-tooth wheel-gearing in this invention is such that the end strains caused by the bevel-wheels are confined within the same structure or frame, and also such that the power may from the same motor be taken off in various directions at various angles and at different speeds, as desired, whereby it adapts itself as a stationary or portable motor to various useful purposes—such, for instance, as the driving of tram-cars, road-carriages, electric launches, winches, drilling, milling, and other shop-tools, rock-drills, revolving hair-brushes and cleaning-brushes, and dental tools.

Figure 5:
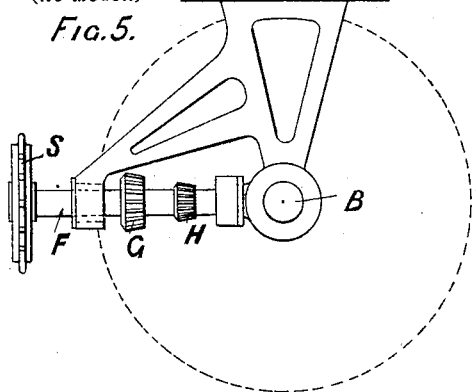
Figure 6:
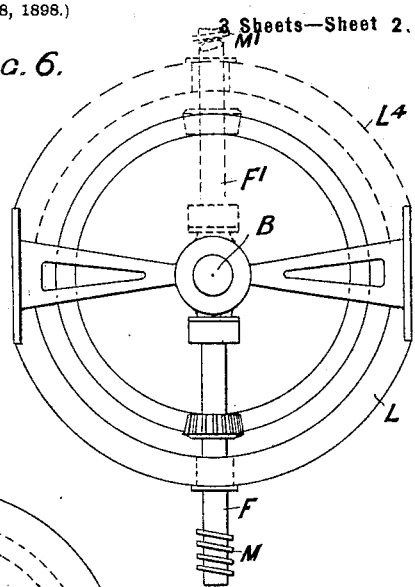
Figure 7:
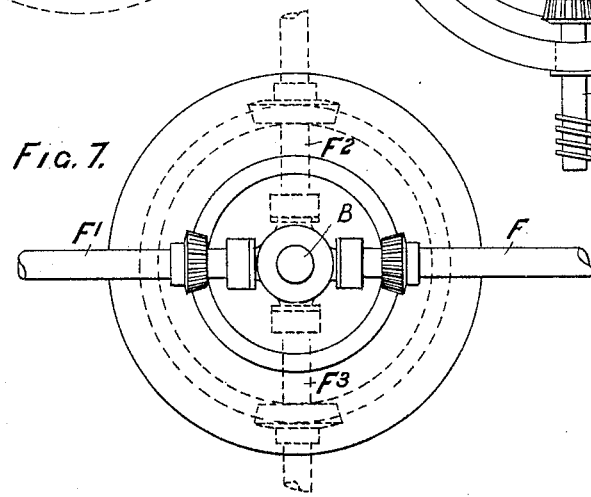
Figure 8:
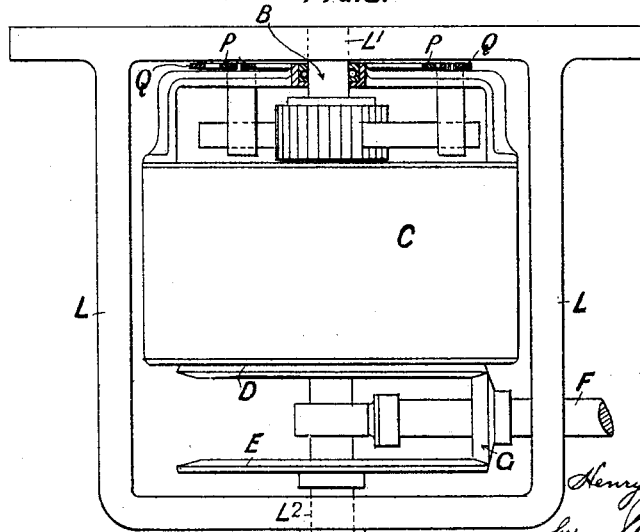

Figure 1 of the drawings is a part sectional side view, supposing the motor-shaft to be vertical; and Fig. 2 is a plan view of same. Fig. 3 is a side view showing the motor in its frame suspended in another frame, and Fig. 4 a plan view of same. Fig. 5 is an end view of the motor with its driven shaft horizontal and arranged for driving, for instance, a motor-carriage. Fig. 6 is a plan view of the motor with its shaft vertical and adapted for driving a motor-carriage, the dotted lines showing it arranged for driving a tram-car. Fig. 7 is a plan view of the motor adapted to drive four shafts. Fig. 8 is a side view of the motor with another arrangement of gearing. Figs. 9 and 10 show the motor with further modifications of gearing.

Referring more especially to Figs. 1 and 2, the armature A is fixed on the shaft B, and the field-magnets are applied to a casing or frame C, rotating freely on the shaft in the opposite direction. On the casing is fixed a bevel-wheel rim D, and on the shaft B is fixed a bevel-wheel E, their conicity being toward each other. Between the two bevel-wheels I provide a spindle F, fitted with two bevel-pinions G and H, which gear respectively with the aforesaid wheel D on the field-magnet casing C and with the wheel E on the motor-shaft B. The inner end of this pinion-spindle F may, as shown and as preferred, work in a sleeve I, forming a bearing wherein the motor-shaft B turns. The other or outer bearing K of the pinion-spindle F is in or forms parts of the frame L, wherein the motor is held and wherein the motor-shaft B has its bearings at L' and L². The bearings are all by preference ball-bearings. The field-magnet casing C has also by preference ball-bearings where it works on the shaft B. The aforesaid sleeve I is formed in a bridge or cross-bar fixed to the frame L. I have shown one shaft F in full lines provided with a worm M, gearing with a worm-wheel N on a spindle O, that may be the axle of a motor-car or one of the axles of a tram-car, and I have shown in dotted lines another spindle F', which similarly drives a shaft O' by means of a worm M' and worm-wheel N'. It will thus be seen that I have the facility for transmitting power either through shaft F or F' or both, and, furthermore, I may also, as will be easily understood, transmit motion not only from two such shafts as F and F', but from three or more shafts similarly driven—viz., by means of pinions like H gearing with the wheel E—and each of these radiating shafts having by preference one bearing at the inner end in the sleeve-piece I and having the other bearing in the framing L, which will then have to be suitably modified in form. The brushes may be arranged as shown, the rings P and Q being fixed on the field-magnet framing and serving to supply current to the brushes for the armature and the field-magnets.

The motor and all the gearing may in this and the following examples to be described be inclosed in an outer casing instead of being merely surrounded by a frame L, the spindle F and other spindles passing out through such casing as required. It is obvious that in such a construction the motor may be made portable by providing the armature-spindle with a handle in which said spindle can revolve and by providing the casing also with a handle on the opposite side of said handle end of the spindle and in line therewith, and as the strains are within the frame and vibration is practically done away with it can be held in the hands and used for rock-drilling and dental and other drilling purposes or for hair-brushing, the drill or other tool or implement being mounted on the spindle B or on a spindle like F. When several spindles like F are provided, each may drive a machine or each may be fitted with a drill.

In Figs. 3 and 4 the motor-frame L has pivots $L^3$ and is suspended by the links R from, say, the under side of a motor-carriage frame.

In Fig. 5 the motor-shaft B is shown horizontal and the spindle fitted with a sprocket-wheel S for chain-driving suitable, for instance, for a motor-carriage.

Fig. 6 shows a vertical motor-shaft B, suitable for working a shaft F, with worm M for transmitting motion to a motor-carriage axle. When the motor is applied to the driving of a tram-car, I also use a spindle F', as shown in dotted lines, and continue the framing L, as shown in dotted lines.

In Fig. 7, as already indirectly referred to in the description of Figs. 1 and 2, four radiating spindles F F' $F^2$ $F^3$ are shown for working four machines or for operating four drilling or milling tools working simultaneously.

Fig. 8 shows a modification of gearing, where the spindle F has only one bevel-wheel G, which gears with the bevel-wheels D and E. Instead of having the wheel H smaller than the wheel G, I may make it the same size or larger, whereby the speeds of various parts will be relatively changed.

In Fig. 9 the wheel H is made larger than the wheel G. On the field-magnet hub is fixed the bevel-wheel D, which is formed with a recessed part, so that the bevel-wheel H can rotate therein. This bevel-wheel H, as well as the bevel-wheel G, is fixed on the spindle F. I thus increase the speed of the spindle F, as compared with the arrangement previously described.

In Fig. 10, an alternate construction, the bevel-wheel E, fixed on the armature-spindle B, is recessed, so that the bevel-wheel G on the spindle F can rotate therein. The bevel-wheel D on the field-magnet hub gears with the larger bevel-wheel G, and the small bevel-wheel H, which is also fixed on the spindle F, gears with the larger bevel-wheel E on the armature-spindle B.

It is obvious that wheels like G and H may also be placed on a spindle, such as F', opposite to or at an angle to the spindle F; also, that more than one such spindle F' may be provided and driven similarly.

My construction and arrangement as set forth is eminently a self-contained motor, whereby the strains usually transmitted to the driven pieces are confined within the motor-framing and in a large degree counteract one another, producing a much smaller resultant strain than in other arrangements.

The absence of vibration caused by using bevel-wheels on the armature and on the field-magnet hub of opposite conicity, and the whole contained within a frame which is not exposed to vibrations, and therefore can be made light, renders my motor particularly applicable to portable tools held in the hand, as for rock-drills, revolving brushes, and the like, and for road-carriages, tram-cars, and electric launches, as it produces an even motion without transmitting any vibratory strains to the hands in which it is held or to the vehicle to which it is applied.

I claim—

1. In an electric motor, in which the field-magnet hub runs loosely on the spindle and the armature is fixed on the spindle and both rotate in opposite directions, the combination of a bevel-wheel on the field-magnet hub, a bevel-wheel on the armature-spindle, the conicity of the two bevel-wheels being toward each other, bevel-wheel gearing engaging therewith arranged between the said bevel-wheels, and a framing provided with bearings for the spindles and surrounding and containing the whole motor and gearing, substantially as set forth.

2. In an electric motor in which the field-magnet hub runs loosely on the spindle and the armature is fixed on the spindle and both rotate in opposite directions, the combination of a bevel-wheel on the field-magnet hub, a bevel-wheel on the armature-spindle, the conicity of the two bevel-wheels being toward each other, bevel-gearing engaging therewith arranged between the said bevel-wheels, a bearing-piece wherein the armature-spindle rotates and which forms bearing for a bevel-gearing spindle and a framing provided with bearings for the spindles and surrounding and containing the whole motor and gearing, substantially as set forth.

3. An electric motor consisting of an armature fixed on its spindle and rotating in one direction, field-magnets with hub rotating on the spindle in the opposite direction, a bevel-wheel on the said hub, a bevel-wheel on the armature-spindle, the conicity of the two bevel-wheels being toward each other, a bevel-wheel engaging with both bevel-wheels and arranged between them, a framing provided with bearings for the spindles and surrounding and containing the whole motor and gearing, and means for supplying current to the armature and field-magnets, substantially as set forth.

4. An electric motor consisting of an armature fixed on its spindle and rotating in one direction, field-magnets with hub rotating on the spindle in the opposite direction, a bevel-wheel on the said hub, a bevel-wheel on the armature-spindle, the conicity of the two bevel-wheels being toward each other, a bevel-wheel engaging with both bevel-wheels and arranged intermediate between them, a bearing-piece wherein the armature-spindle rotates and which forms bearing for the spindle of the intermediate bevel-wheel, a framing provided with bearings for the spindles and surrounding and containing the whole motor and gearing and means for supplying current to the armature and field-magnets, substantially as set forth.

In testimony that I claim the foregoing as my invention I have signed my name in presence of two subscribing witnesses.

HENRY WILLIAM HEADLAND.

Witnesses:
FRED C. HARRIS,
E. W. ECAILLE.